United States Patent Office 3,425,273
Patented Feb. 4, 1969

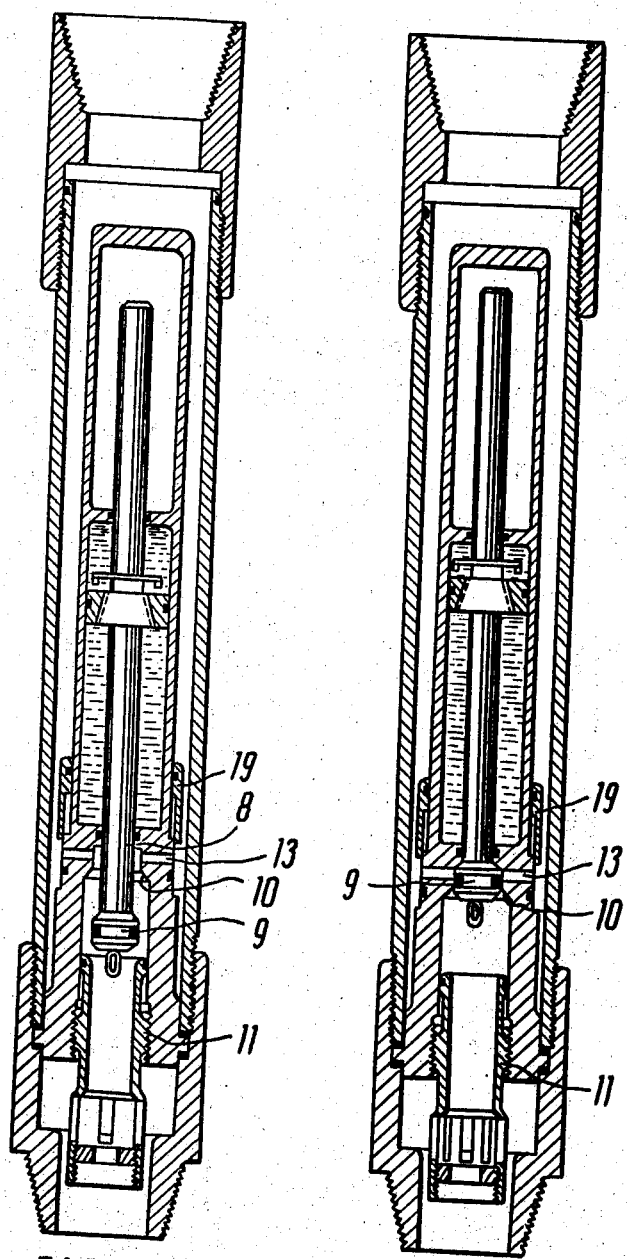

3,425,273
SYSTEM FOR DETERMINING FORMATION CHARACTERISTICS
Kamil Gumerovich Khamzin, ulitsa Sovetskaya 30, kv. 3, and Pavel Sergeevich Lapshin, Prospect Oktyabrya 45/2, kv. 35, both of Ufa, U.S.S.R.
Filed Aug. 17, 1965, Ser. No. 480,305
U.S. Cl. 73—155    6 Claims
Int. Cl. E21b 49/00

---

ABSTRACT OF THE DISCLOSURE

Systems for determining formation characteristics, more specifically valve gears controlling the process of formation testing by producing open and closed test periods without interference on the operator's part. The open and closed periods are produced automatically during longitudinal movement of the rod relative to other parts of the casing with the rod passing through three chambers isolated from each other with one end of the rod remaining in the gas-filled chamber, its middle part traversing the chamber of the hydraulic time delay and the other end connected to the valve head being disposed in the valve box exposed to the effect of hydraulic pressure of the formation for the well. The longitudinal rod movement is caused by the difference is pressures acting on the butt ends of the rod on the side of the gas-filled chamber and valve box.

---

The present invention relates to systems for determining formation characteristics, and more particularly to systems provided with a hydraulic time delay to be employed in conjunction with a formation tester and subsurface pressure recording devices.

Known at the present time are various systems for determining formation characteristics which include a set of valves actuated by various means. Some valves are adapted to operate by the rotation of a drill string, others by an impact (e.g. a metal bar cast into the interior of drill pipes); and others by the forward travel of the drill pipes or pump tubing and may comprise a hydraulic time delay controlling the action of the valves by means of a rod. The known systems may include combination of the above mentioned three types of valves.

Among the disadvantages inherent in the valves of the first type, the need for rotating the drill string can be pointed out, this operation being undesirable and not always possible, particularly in deep wells.

A system including valves of the second type which are actuated by impact is also disadvantageous, being unreliabe in operation, as the force of blow under various conditions depends on the height of throw, viscosity and height of the fluid column which fills the interior of drill string, besides being ineffective with small diameter pipes, since the metal bar when thrown down may be jammed in the drill string.

A system incorporating valves of the third type also suffers from a substantial disadvantage, i.e. the difficulty of a precise control in very deep wells of the required forward motion of the drill pipes for actuating the valve. Other difficulties also take place, in moving forward the drill string, with such difficulties being induced by slacking off or sticking of the tool during the "round trip" due to irregularities of the well bore.

The object of the present invention is to eliminate said difficulties and disadvantages, by providing a system for the determination of formation characteristics, said system obviating the need in a time and labor consuming operation for moving a drill string or casting a foreign object down the interior of drill pipes, said novel system providing for the automation of the valve control, at most favorable conditions of testing the formation.

The object has been attained by providing a system for the determination of formation characteristics comprising a plurality of valves enclosed in a tubular casing, said valves serving for closing or opening passages for the entry of the formation fluid (oil or gas), and a hydraulic time delay controlling the time of opening or closing said valves, by means of a rod wherein according to the invention a chamber is mounted in a tubular casing and filled with gas. The chamber ensures the difference in the formation pressure and that of the gas in said chamber, said difference being utilized for the actuation of a rod. One end of the rod moves inside said chamber, and the opposite end mounts a set of valves.

The set of valves may be disposed in a box housed in a tubular casing, with passages in said box for the flow of the formation fluid into drill pipes, and a rod the end of which moves in the box containing said set of valves.

One embodiment of the invention provides for a set of valves comprising a two-stage cylinder which is rigidly fixed to the end of the rod made movable in the box, and a seat corresponding to said cylinder valve provided in the bottom plate of the box.

Another embodiment incorporates a set of valves comprising a cylinder valve which is rigidly fixed on the end of the rod, and a valve made a liner, adapted to move longitudinally and mounted on the outer wall of the box.

The valve made a liner serves to prevent the entry of the fluid into the box out of the drill string. The valve may be substituted for by a conventional non-return valve which is to be mounted above said device.

The cylinder valve may be mounted at the rod end, and arranged for adjustment.

A recess serving as a seat for the valve fixed at the rod end is provided in the upper face plate of the box. Said recess is also a catch for limiting the the travel of the rod.

A cylinder liner adjusting the time of closing the valve set is rigidly fixed to the lower face plate of the box.

The system is brought into a working condition before being lowered down the well by means of a tie member fixed at the end of the rod, said rod moving inside the box.

Exemplary embodiments of the present invention will be described by way of illustration with reference to the accompanying drawings in which:

FIGS. 2 to 5 show the sectional view of various embodiments of the invention with a set of valves rigidly fixed to one end of the rod, and valves in the form of liners in the positions from the moment prior to lowering down the well to the moment of pulling out the well.

Figure 1:
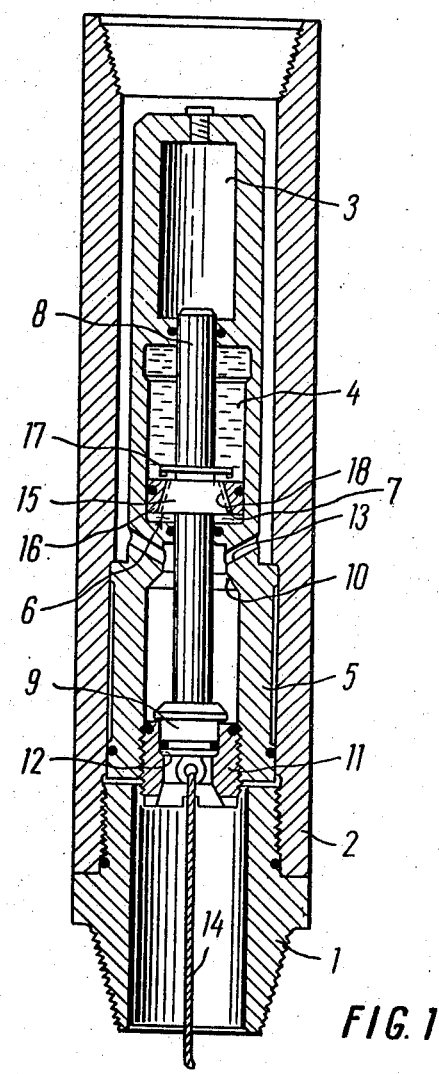
FIG. 1 is a longitudinal sectional view of the system with valves which are rigidly fixed to one end of the rod.

The assembly shown in FIG. 1 is mounted above a formation tester (not shown) every few empty pipes. The assembly is fixed in the drill string by means of subs 1 links with a casing 2 which houses the units and parts of the assembly described hereinbelow.

A chamber 3 provided in the upper portion of the tubular casing 2 (see the drawing) is filled with gas under atmospheric or excess pressure if the assembly is lowered down a very deep well. Chamber 4 of a hydraulic time delay filled with a viscous fluid (oil) and a box 5 for accommodating the set of valves are mounted below the chamber 3. A built-up piston 6 provided with a spiral channel 7 of a small cross-section and large length is disposed in the chamber 4. The channel builds up considerable resistance to the flow of the fluid from the upper interior portion (not shown) into the lower portion of the chamber 4. The piston 6 has a double-ended rod 8 rigidly fixed therein, with one end of the rod moving together with the lift of the piston 6 in the chamber 3, and the opposite end with a two-stage cylinder valve 9 moving in the box 5.

A recess 10 is provided in the upper face plate of the box 5 to serve as a seat for the valve 9 and as a catch to limit the travel of the rod 8 on the upstroke of the piston 6. A liner 11 with a bore 12 serving as a seat for the valve 9 is fixed rigidly in the bottom face plate of the box 5.

Passages 13 in the body of the box 5 serve for the flow of the formation fluid into the drill pipes. A tie member 14 fixed rigidly to the end of the rod 8 moving in the box 5 is arranged to bring the assembly into working condition before being lowered down the well.

When "recharging" the system on the surface, cone 15 of the piston 6 moves off ring 16 of the piston 6 to a distance equalling the clearance between retainer 17 and ring 16 with such clearance serving to facilitate the travel of the rod 8 with the cone 15 and the ring 16, since the fluid flows from the lower portion (according to the drawing) of the chamber 4 to the upper one through a relatively wide annulus between the cone 15 and ring 16. A spiral channel 7 is formed by a spiral groove 18 on the cone 15 and the inner surface of the ring 16.

The retainer 17 is rigidly fixed to the rod 8 thus retaining the ring 16 and moving together with it under an effort applied on the end of rod 8 which moves in the box 5.

The gas-filled chamber 3 serves to create the difference in the formation pressure and the pressure of gas contained in the chamber. The pressure difference is utilized for actuating the piston 6 together with the rod 8, thus obviating the need for moving the drill string forward or casting a foreign body down the drill pipes.

Figure 6:
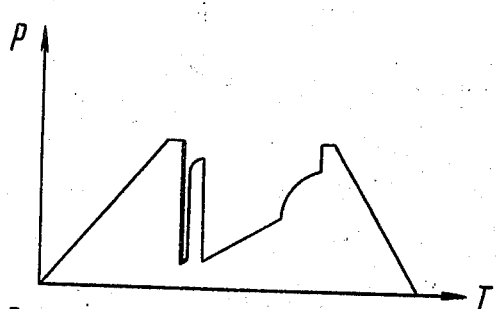
FIGS. 6 to 9 are pressure curves in the formation, surrounding the well bottom corresponding to the position of the valve set of the embodiments shown in FIGS. 2 to 5.
Figure 7:
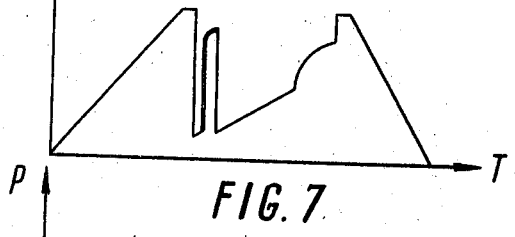
Figure 8:
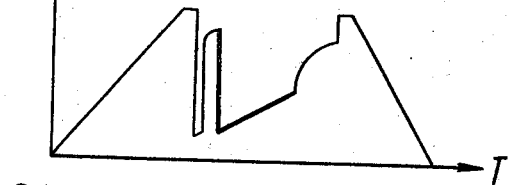

At the moment the inlet valve of the formation tester is open (not shown), the pressure in the testing zone under a packer drops sharply (see heavy line in FIG. 6). This is due to the ingress of the fluid into empty pipes, repressuring taking place between the formation tester and the system, at which the initial repressuring curve is recorded (FIG. 7) by means of a sub-surface pressure recording device (not shown). The formation pressure is applied to the valve 9, whereby the end of the rod 8 enters the chamber 3. After a 10 to 15 minute travel the valve 9 leaves the liner 11, thus opening a free passage for the entry of the formation fluid into empty pipes mounted above the system. It takes 20 to 40 minutes for the formation fluid to pass through the liner 11 and passages 13 in the body of the box 5. At that time the sub-surface pressure gauge records the influx curve (FIG. 8). The valve 9 continues its travel together with the rod 8 under the effect of the upward fluid pressure until it rests on the seat 10. When reaching the seat, the valve 9 closes passages 13, thus cutting off the formation fluid entry into the drill pipes mounted above the system.

The time interval of the valve 9 and rod 8 travel from the moment it leaves the liner 11 and comes to rest on the seat 10 determines the influx time interval. The influx time interval, i.e. the time interval before the valve 9 closes passages 13 is adjusted by the vertical travel of the liner 11 along the thread in the box 5.

Figure 9:
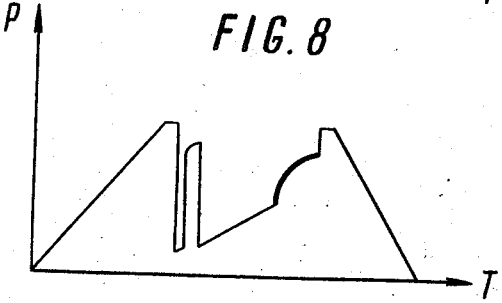

After the passages 13 have been closed with the valve 9, the formation fluid influx is cut off, and the pressure gauge is able to record the final repressuring curve (FIG. 9). Then the system is lifted out of the hole.

The system as described herein is applicable to wells with a relatively low hydrostatic pressure (not more than 3000 m. deep.)

With the increase in depth the empty pipes between the formation tester and the present system are subjected to a high drop of pressure which may lead to the buckling of pipes and breaking of joints. Heavier pipes are undesirable due to their small bore and to obtain a large enough space for the fluid many heavier pipes will be required, which is prohibitive in very deep wells due to a considerable weight of the string. In addition heavy weight of piping may overstress the string and thus reduce the permissible depth for lowering down the tool.

As the well increases in depth, both the temperature and hydrostatic pressure are building up. As a result, the empty space, after the valve of the formation tester has been opened, will be rapidly filled with expanded drilling mud. Under such conditions the sub-surface pressure gauge will not record the initial repressuring curve, since the pressure differential will have no time to spread due to the insignificant volume of the empty space. Besides, due to the low productivity of the formation, the initial repressuring curve will not have time enough to attain the value sufficient for determining the formation pressure.

In order to employ the present invention in wells 7000 m. in depth and deeper without the use of empty pipes, the system is provided with a valve 19 for closing the passages 13. The valve in the form of a liner is mounted longitudinally movable on the outer wall of the box 5. The valve 9 fixed to the end of the rod 8 is made in the form of a cylinder, and, if needed, can be adjusted to the length of the rod 8. The system so embodied is mounted directly above the formation tester (not shown) and not every few pipes to form an empty space.

Figure 2:
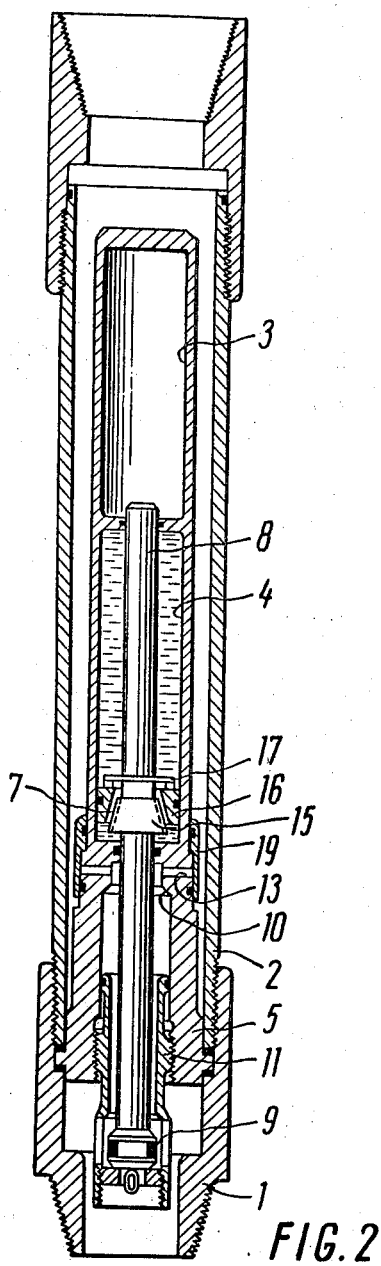

FIG. 2 shows the system in the position for lowering down the well before the inlet valve of the formation tester disposed directly above the system is opened. In that position the rod 8, the piston 6 of the hydraulic time delay and the valve 9 are in the extreme bottom position (in accordance with the drawing). The valve 19 shuts off the passages 13, and the valve 9 is open. When the passages 13 are closed by the valve 19, the fluid in the pipe is prevented from flowing into the box 5. As is known, the amount of the fluid to be poured into the pipes is set so that the pressure differential will be limited. With the valve of the formation tester open, the formation fluid passes from the tested zone into the box 5 opening the valve 19, pushing upwardly and out the pipe fluid, and finally passes into the pipe. This period is recorded by the pressure gauge by a heavy line (FIG. 6). As may be seen from the pressure curve in FIG. 6, a sharp drop in pressure at the moment of opening the valve 9 is observed, which is followed by a slight rise in pressure during the period of the initial influx. At that period the rod 8 begins its upward stroke (according to the drawing) induced by the pressure difference underneath the valve 9 and the chamber 3.

The upward stroke of the rod 8 is retarded by the hydraulic time clock, since the cone 15 of the piston 6 seats onto the ring 16 and the oil with the upstroke of the piston 6 and rod 8 flows through a passage 7, which passage is formed when the cone 15 with a spiral groove 18 is pressed against the ring 16.

Figure 3:
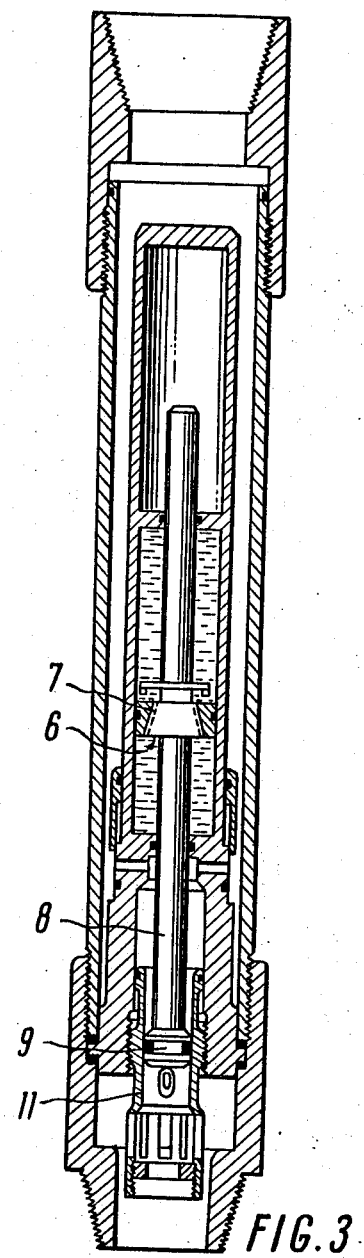

The initial influx is completed when the valve 9 enters the bore of the liner 11. The liner in that case has smooth walls to ensure free reciprocation of the cylinder valve 9. From that moment on the speed of the rod 8 with the piston 6 of the time delay valve 9 is increased, as the pressure underneath the valve 9 is building up owing to it being levelled-off to the value of the formation pressure. The period is shown in FIG. 3. In that period the pressure gauge records the initial repressuring curve by a heavy line.

FIG. 4 shows the period of the secondary influx, when the valve 9 leaves the liner 11 on its upward travel.

At that moment the formation fluid passes through the liner 11, passages 13 in the box 5 to the drill pipes pushing forward and out the fluid contained in the pipes. The pressure curve as recorded shows a sharp drop in pressure at first corresponding to the moment when the valve 9 leaves the liner 11, and then follows a smooth increase in pressure, i.e. the secondary influx curve shown by a heavy line in FIG. 8.

When the valve 9 comes to its extreme upward position (according to the drawing), it rests on the seat 10 thus cutting off the entry of the formation fluid into the pipes through passages 13 and such period is shown in FIG. 5. From that moment on the pressure gauge proceeds to record the final represurring curve, which is most important for the determination of physical characteristics of the formation. The final curve is shown in FIG. 9 by a heavy line.

In order to construct such curve, the apparatus should be kept in the well bottom for about 1 hour. Then usually the well is de-packered and drill pipes with the formation fluid sample are lifted together with a set of testing devices, sub-surface pressure recorders and pressure curves.

The system allows for pumping the fluid down, e.g. for restoring lost circulation if the tool becomes stuck, whereas the fluid flowing through passages 13 pushes the valve 9 and rod 8 downwardly until the passage is open for free circulation.

The advantages of the system are of particular interest. If the fluid conductivity of the formation is low, a longer period of the fluid influx will be needed.

If the opposite takes place, i.e. the formation conductivity is high, and the influx of the formation fluid is vigorous, it is desirable to reduce the time interval for the influx. Since the speed of the rod 8 and valve 9 depends on the pressure of the pipe fluid column, the high rate of influx will rapidly raise such pressure and thus increase the speed of the rod, while reducing the time of the influx, and vice versa, slow influx will reduce the speed of the rod with a corresponding increase in the time interval. It is obvious, therefore, that the system adjusts automatically the periods of influx and repressuring under the most favorable conditions for testing. The range of adjustment may be changed by varying the length and cross-section of the capillary groove 7 of the hydraulic time clock, and by changing the initial gas pressure in the chamber 3.

While embodiments of the present invention have been described herein, it is obvious that changes in details of construction can be resorted to without departing from the spirit of the invetnion and it is accordingly to be understood that no limitations be implied and that the annexed claims be given the broadest interpretation to which the employed language fairly admits.

What we claim is:

1. A system for determining formation characteristics lowered down a well on drill pipes together with a formation tester and sub-surface pressure recording device, comprising a tubular casing connected with the drill pipes, a valve box disposed in the tubular casing, said valve box being provided with channels for the passage of the formation fluid, a valve head positioned in said valve box for opening and closing said channels, means defining a gas-filled chamber mounted in said casing for ensuring difference between the formation pressure and the pressure of the gas contained in the chamber, a rod, one end of said rod being connected with said valve head and the other end being placed in said gas-filled chamber and progressively moving under the effect of the built-up pressure difference, means for sealing said rod in said chamber, a hydraulic time delay device disposed in said casing for controlling the time of opening and closing of the channels in said valve box via said valve head by means of said rod.

2. The system for determining formation characteristics as claimed in claim 1, in which a tie member is affixed to the end of said rod moving in said valve box for making the system operative prior to its lowering in the well.

3. The system for determining formation characteristics as claimed in claim 1, in which said valve head is defined by a two-stage cylinder and seats in the bottom and top end walls of said box corresponding to said two-stage cylinder.

4. The system for determining formation characteristics as claimed in claim 3, in which said valve head is secured to the end of said rod and means for adjusting the position thereof along said rod.

5. The system for determining formation characteristics as claimed in claim 1, in which said valve head is defined by a cylinder and a longitudinally moving liner overlapping its channels for preventing access of fluid coming from the drill pipes into the valve box is positioned on the outer wall of the valve box.

6. The system for determining formation characteristics as claimed in claim 1, in which a theaded liner is secured in the bottom end wall of said valve box for controlling the time of closing of said channels in said box by said valve head.

References Cited

UNITED STATES PATENTS

| 2,189,919 | 2/1940 | Moore | 73—155 |
| 2,690,226 | 9/1954 | Comstock | 251—54 X |

RICHARD C. QUEISSER, *Primary Examiner.*

JERRY W. MYRACLE, *Assistant Examiner.*

U.S. Cl. X.R.

166—151